(12) United States Patent
Oshitani et al.

(10) Patent No.: US 7,320,229 B2
(45) Date of Patent: Jan. 22, 2008

(54) EJECTOR REFRIGERATION CYCLE

(75) Inventors: Hiroshi Oshitani, Toyota (JP);
Hirotsugu Takeuchi, Nagoya (JP);
Haruyuki Nishijima, Obu (JP);
Makoto Ikegami, Anjo (JP); Naoki Yokoyama, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/497,032

(22) Filed: Jul. 31, 2006

(65) Prior Publication Data

US 2007/0028646 A1    Feb. 8, 2007

(30) Foreign Application Priority Data

Aug. 2, 2005    (JP)    ............................. 2005-224119

(51) Int. Cl.
*F25B 1/06*    (2006.01)
(52) U.S. Cl. .......................................... 62/500; 62/191
(58) Field of Classification Search ................. 62/170, 62/500, 524, 174, 191, 527
See application file for complete search history.

(56) References Cited

U.S. PATENT DOCUMENTS

| 6,477,857 | B2 | 11/2002 | Takeuchi et al. | |
|---|---|---|---|---|
| 6,574,987 | B2 | 6/2003 | Takeuchi et al. | |
| 6,729,149 | B2 | 5/2004 | Takeuchi | |
| 7,059,150 | B2 * | 6/2006 | Komatsu et al. | 62/500 |
| 2004/0003608 | A1 * | 1/2004 | Takeuchi et al. | 62/170 |
| 2005/0178150 | A1 | 8/2005 | Oshitani et al. | |
| 2005/0268644 | A1 | 12/2005 | Oshitani et al. | |

FOREIGN PATENT DOCUMENTS

JP    05-312421    11/1993
JP    2004-257694    9/2004

* cited by examiner

*Primary Examiner*—Melvin Jones
(74) *Attorney, Agent, or Firm*—Harness, Dickey & Pierce, PLC

(57) ABSTRACT

A branch passage, which is branched at a point on an upstream side of an ejector, is connected to a refrigerant suction inlet of the ejector. An evaporator is arranged in the branch passage, and a capillary tube is arranged on an upstream side of the evaporator.

11 Claims, 9 Drawing Sheets

EJECTOR REFRIGERATION CYCLE

CROSS REFERENCE TO RELATED APPLICATION

This application is based on and incorporates herein by reference Japanese Patent Application No. 2005-224119 filed on Aug. 2, 2005.

BACKGROUND OF THE INVENTION

1. Field of the Invention

The present invention relates to an ejector refrigeration cycle, which includes an ejector.

2. Description of Related Art

Previously, as a vapor compression refrigeration cycle, an ejector refrigeration cycle, which uses an ejector that serves as a refrigerant depressurizing means and a refrigerant circulating means, has been proposed in Japanese patent No. 3322263.

In Japanese patent No. 3322263, a first evaporator is connected to a refrigerant outlet of the ejector, and a gas/liquid separator is connected to a refrigerant outlet of the first evaporator, and a second evaporator is connected between a liquid phase refrigerant outlet of the gas/liquid separator and a refrigerant inlet of the ejector.

In contrast to the above cycle, an ejector refrigeration cycle shown in FIG. 15 has been proposed in Japanese Unexamined Patent Publication No. 2005-308380 published on Nov. 4, 2005 (corresponding to US 2005/0178150 A1 and US 2005/0268644 A1). In the ejector refrigeration cycle of Japanese Unexamined Patent Publication No. 2005-308380, a branch passage 16, which is branched on an upstream side of an ejector 14 and is connected to a refrigerant inlet 14b of the ejector 14, is provided, and a throttle mechanism 17 and a second evaporator 18 are provided in the branch passage 16.

In the case of Japanese Patent No. 3322263, the refrigerant is drawn into the second evaporator only by the refrigerant suction force of the ejector. Thus, a cycle pressure difference becomes small. In such a case, under a specific operational condition where the input of the ejector 14 becomes small, the refrigerant suction force of the ejector is reduced, and thereby the refrigerant flow quantity of the second evaporator is reduced.

In contrast to this, in the ejector refrigeration cycle of Japanese Unexamined Patent Publication No. 2005-308380, the second evaporator 18 is arranged parallel to the ejector 14, so that the refrigerant can be circulated to the second evaporator 18 using both of the refrigerant suction force of the ejector 14 and the refrigerant suction/discharge force of the compressor 11. Therefore, even under the specific operational condition where the input of the ejector 14 becomes small, the required refrigerant flow quantity of the second evaporator 18 and thereby the required cooling performance of the second evaporator 18 can be easily ensured. At the same time, the refrigerant flow quantity of the second evaporator 18 can be easily adjusted by the dedicated throttle mechanism 17.

In the refrigeration cycle of Japanese Unexamined Patent Publication No. 2005-308380, the refrigerant evaporating pressure (the refrigerant evaporating temperature) becomes lower than that of the first evaporator 15 by the amount, which corresponds to the pressure increasing effect of the ejector 14. As described above, by reducing the refrigerant evaporating temperature of the second evaporator 18, the cooling performance of the second evaporator 18 can be improved.

In the refrigeration cycle of Japanese Unexamined Patent Publication No. 2005-308380, when the refrigerant quantity supplied to the second evaporator 18 of the low temperature side is excessively large, the liquid phase refrigerant, which has not been evaporated through the second evaporator 18, is drawn into the ejector 14 and is then evaporated through the first evaporator 15. In contrast, when the refrigerant quantity supplied to the second evaporator 18 is insufficient, the advantageous feature of the second evaporator 18 (i.e., the lower refrigerant evaporating temperature of the second evaporator 18 in comparison to the first evaporator 15) cannot be utilized, and thereby the cooling performance of the second evaporator 18 is reduced. Therefore, it is important to supply the sufficient amount of refrigerant to the second evaporator 18 without causing the shortage of the refrigerant in the second evaporator 18 to improve the performance.

For instance, in a case where an expansion valve, which is a known typical throttling means, is used as the throttle mechanism 17 of the second evaporator 18, the expansion valve rapidly reduces the throttle opening, so that the refrigerant passage cross sectional area for achieving the predetermined amount of pressure reduction becomes small. Thus, the flow quantity of the refrigerant passing through the expansion valve tends to be reduced, and thereby the performance of the second evaporator 18 is reduced.

Furthermore, in the expansion valve, the refrigerant passage cross sectional area is reduced, so that the refrigerant passage of the expansion valve can be easily clogged with an obstacle. The clogged obstacle significantly reduces the performance.

SUMMARY OF THE INVENTION

The present invention addresses the above disadvantages. Thus, it is an objective of the present invention to provide an ejector refrigeration cycle, which has an evaporator that achieves an improved performance.

To achieve the objective of the present invention, there is provided an ejector refrigeration cycle, which includes a compressor, a radiator, an ejector, a branch passage, a throttle mechanism and an evaporator. The compressor suctions and compresses refrigerant. The radiator releases heat from high pressure refrigerant, which is discharged from the compressor. The ejector includes a nozzle portion, a refrigerant suction inlet and a pressurizing portion. The nozzle portion depressurizes and expands refrigerant, which is supplied from an outlet of the radiator. Refrigerant is suctioned from the refrigerant suction inlet by a high velocity refrigerant flow that is discharged from the nozzle portion. The pressurizing portion decelerates and pressurizes a refrigerant flow, in which the high velocity refrigerant flow discharged from the nozzle portion and the suctioned refrigerant supplied from the refrigerant suction inlet are mixed. The branch passage is branched at a point on an upstream side of the ejector and is connected to the refrigerant suction inlet. The throttle mechanism is provided in the branch passage and includes a capillary tube. The evaporator is arranged on a downstream side of the throttle mechanism in the branch passage.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
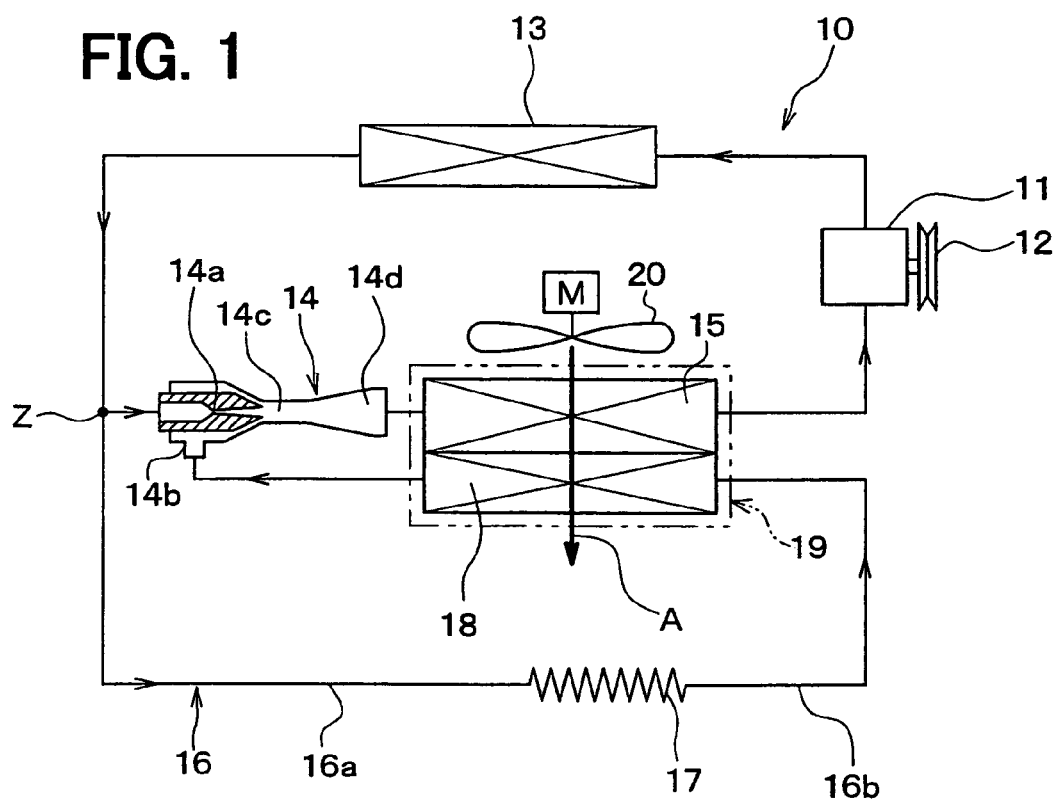
FIG. 1 is a refrigerant circuit diagram indicating an ejector refrigeration cycle according to a first embodiment of the present invention.

FIG. 1 shows an exemplary case where an ejector refrigeration cycle 10 according to a first embodiment of the present invention is applied to a vehicle refrigerator. In the ejector refrigeration cycle 10 of the present embodiment, a compressor 11, which suctions and compresses refrigerant, is rotated by a vehicle engine (not show) through, for example a pulley 12 and a belt.

The compressor 11 may be a variable displacement compressor or a fixed displacement compressor. In the case of the variable displacement compressor, a refrigerant delivery capacity of the compressor is adjusted by changing a refrigerant displacement. In the case of the fixed displacement compressor, a refrigerant delivery capacity of the compressor is changed by adjusting an operating ratio of the compressor through connection and disconnection of an electromagnetic clutch. Furthermore, in a case where an electric compressor is used as the compressor 11, the refrigerant delivery capacity of the compressor can be adjusted by adjusting a rotational speed of an electric motor.

A heat radiator 13 is provided on a refrigerant outlet side of the compressor 11. The radiator 13 exchanges heat between the high pressure refrigerant, which is outputted from the compressor 11, and the external air (the air external to a vehicle passenger compartment), which is blown by a cooling fan (not shown), so that the high pressure refrigerant is cooled at the radiator 13.

In this embodiment, the refrigerant of the ejector refrigeration cycle 10 is one (e.g., a fluorocarbon refrigerant or an HC refrigerant), the high pressure of which does not exceed a critical pressure, so that a subcritical vapor compression cycle is implemented. Therefore, the radiator 13 serves as a condenser, which condenses the refrigerant.

An ejector 14 is arranged on a downstream side of the radiator 13. The ejector 14 serves as a depressurizing means for depressurizing the refrigerant and also serves as a refrigerant circulating means (a kinetic pump) for circulating the refrigerant through use of a suctioning action of a high velocity refrigerant jet flow.

The ejector 14 includes a nozzle portion (also referred to as a nozzle) 14a and a refrigerant suction inlet 14b. The nozzle portion 14a isentropically depressurizes and expands the high pressure refrigerant. The refrigerant suction inlet 14b is arranged to communicate with a refrigerant jet outlet of the nozzle portion 14a and draws the gas phase refrigerant from a second evaporator 18 described below.

Furthermore, a mixing portion (also referred to as a mixing chamber) 14c is arranged on a downstream side of the nozzle portion 14a and the refrigerant suction inlet 14b in the flow direction of the refrigerant. In the mixing portion 14c, the high velocity refrigerant, which is discharged from the nozzle portion 14a, is mixed with the suctioned refrigerant, which is suctioned from the refrigerant suction inlet 14b. Furthermore, a diffuser portion (also referred to as a diffuser and serving as a pressurizing portion) 14d is arranged on a downstream side of the mixing portion 14c in the flow direction of the refrigerant. A refrigerant passage cross sectional area of the diffuser portion 14d progressively increases toward its downstream side. With this construction, the diffuser portion 14d decelerates the refrigerant flow and thereby increases the refrigerant pressure. That is, the diffuser portion 14d converts the velocity energy of the refrigerant into the pressure energy. A first evaporator 15 is connected to a downstream side of the diffuser portion 14d of the ejector 14.

A branch passage 16 is branched on an upstream side of the ejector 14 (specifically, an intermediate location of the cycle 10 between the radiator 13 and the ejector 14). The refrigerant suction inlet 14b of the ejector 14 is connected to a downstream side of the branch passage 16. In FIG. 1, this branch point is indicated by Z.

In the branch passage 16, a capillary tube 17, which serves as a throttle mechanism, is arranged at an upstream side location, and the second evaporator 18 is arranged on a downstream side of the capillary tube 17.

Figure 2:
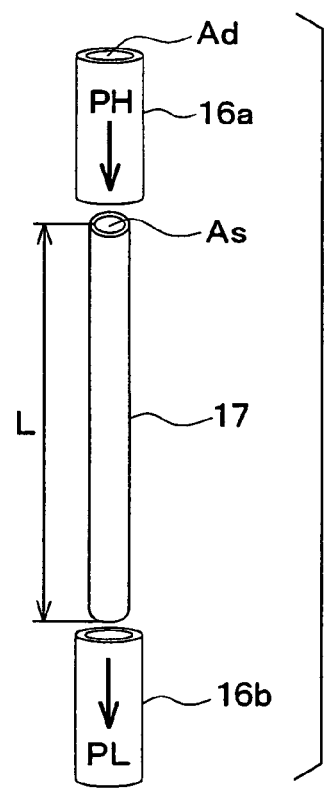
FIG. 2 is an enlarged descriptive view of a capillary tube of the refrigeration cycle shown in FIG. 1.

As shown in FIG. 2, the capillary tube 17 is made of a small diameter tube that has a passage cross sectional area As, which is sufficiently smaller than a passage cross sectional area Ad of a high pressure pipe 16a and a passage cross sectional area of a low pressure pipe 16b. The high pressure pipe 16a and the low pressure pipe 16b form the branch passage 16.

In the capillary tube 17, the passage cross sectional area is throttled, i.e., is reduced from the passage cross sectional area Ad of the high pressure pipe 16a to the minimum passage cross sectional area As, which is defined by the capillary tube inner diameter. Also, the pipe internal frictional force, which is generated in a direction of a pipe length L of the capillary tube 17, causes a predetermined amount of pressure reduction. Here, the amount of pressure reduction is a difference (PH−PL) between the high pressure PH of the refrigerant in the high pressure pipe 16a and the low pressure PL of the refrigerant in the low pressure pipe 16b.

Figure 3:
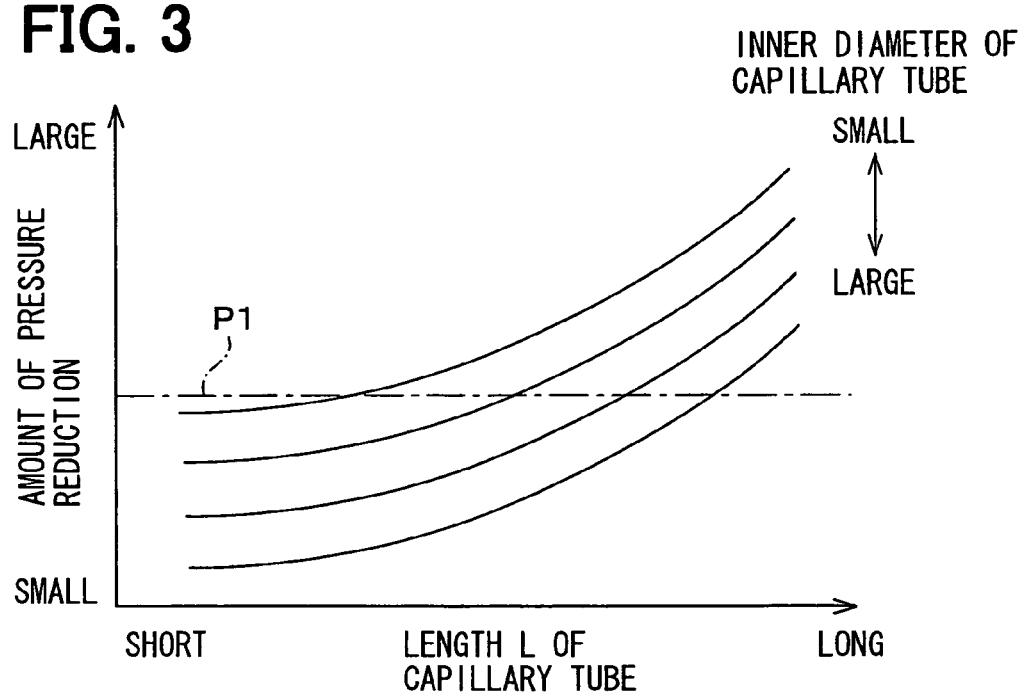
FIG. 3 is a diagram indicating depressurizing characteristics of the capillary tube of the refrigeration cycle shown in FIG. 1.

FIG. 3 shows depressurization characteristics of the capillary tube 17. By increasing the length L of the capillary tube 17 relative to the predetermined amount of pressure reduction P1 (=PH−PL), the inner diameter of the capillary tube 17 can be increased. Thus, in comparison to the expansion valve, the capillary tube 17 can increase the minimum refrigerant passage cross sectional area As relative to the predetermined amount of pressure reduction P1.

In the present embodiment, the first evaporator 15 and the second evaporator 18 form a single cooling unit (an evaporator unit) 19. Here, the first evaporator 15 and the second evaporator 18 can be integrated into a single heat exchanger structure by soldering.

The cooling unit 19 cools the air blown by an electric blower 20. Specifically, the internal air of the vehicle refrigerator is drawn and is applied to the cooling unit 19 by the electric blower 20, so that this air is cooled by the cooling unit 19 and is blown into the vehicle refrigerator. Thus, the interior (a subject cooling space) of the vehicle refrigerator is cooled.

Here, the refrigerant evaporating pressure (the refrigerant evaporating temperature) of the second evaporator 18 is lower than the refrigerant evaporating pressure (the refrigerant evaporating temperature) of the first evaporator 15 due to the reason described latter. Thus, the first evaporator 15 of the high temperature side is arranged at the upstream side location in the air flow A blown by the electric blower 20, and the second evaporator 18 of the low temperature side is arranged at the downstream side in the air flow A blown by the electric blower 20.

Next, the operation of the ejector refrigeration cycle 10 according to the first embodiment will be described. When the compressor 11 is driven by the vehicle engine, the gas phase refrigerant, which is discharged from the compressor 11 and is thereby in the high temperature and high pressure state, is supplied to the radiator 13. In the radiator 13, the gas phase refrigerant of the high temperature and high pressure is cooled by the external air and is thereby condensed. At the branch point Z, the condensed high pressure refrigerant, which is outputted from the radiator 13, is divided into the refrigerant flow conducted to the ejector 14 and the refrigerant flow conducted to the branch passage 16.

The refrigerant flow conducted to the ejector 14 is depressurized and is expanded through the nozzle portion 14a. Thus, the pressure energy of the refrigerant is converted into the velocity energy through the nozzle portion 14a, and the refrigerant is discharged from the jet outlet of the nozzle portion 14a at the high velocity. The suctioning action, which is caused by the decrease of the refrigerant pressure, draws the refrigerant (the gas phase refrigerant), which has passed through the second evaporator 18 of the branch passage 16, into the refrigerant suction inlet 14b.

In the mixing portion 14c located on the downstream side of the nozzle portion 14a, the high velocity refrigerant flow, which is discharged from the nozzle portion 14a, is mixed with the refrigerant flow, which is drawn into the refrigerant suction inlet 14b. Then, the mixed refrigerant is supplied to the diffuser portion 14d. The diffuser portion 14d decelerates the refrigerant velocity and thereby increases the refrigerant pressure because of the increasing passage cross sectional area of the diffuser portion 14d. Specifically, the velocity energy (the expansion energy) of the refrigerant is converted into the pressure energy, and thereby the pressure of the refrigerant is increased.

The refrigerant, which is outputted from the diffuser portion 14d of the ejector 14, is supplied to the first evaporator 15. In the first evaporator 15, the low temperature and low pressure refrigerant absorbs the heat from the air blown by the electric blower 20, so that the refrigerant is evaporated. The refrigerant, which is outputted from the first evaporator 15, is supplied to the compressor 11 and is compressed once again.

In contrast, the refrigerant flow, which is supplied to the branch passage 16, is depressurized through the capillary tube 17 and becomes the low pressure refrigerant, which is then supplied to the second evaporator 18. The second evaporator 18 is arranged on the downstream side of the first evaporator 15 in the flow direction A of the air blown by the electric blower 20. Thus, in the second evaporator 18, the low temperature and low pressure refrigerant absorbs the heat from the air, which has been blown by the electric blower 20 and has passed the first evaporator 15. Therefore, the air, which is blown by the electric blower 20, is cooled by the first and second evaporators 15, 18.

As described above, according to the present embodiment, the refrigerant, which is present on the downstream side of the diffuser portion 14d of the ejector 14, is evaporated by the first evaporator 15, and the refrigerant in the branch passage 16 is passed through the capillary tube 17 to depressurize the refrigerant and is then evaporated in the second evaporator 18. Therefore, the cooling action can be taken simultaneously in both of the first and second evaporators 15, 18.

At this time, the refrigerant evaporating pressure of the first evaporator 15 is the pressure after the increasing of the pressure through the diffuser portion 14d. In contrast, since the outlet of the second evaporator 18 is connected to the refrigerant suction inlet 14b of the ejector 14, the lowest pressure after the depressurization in the nozzle portion 14a is available to the second evaporator 18.

In this way, the refrigerant evaporating pressure in the second evaporator 18 can be made lower than the refrigerant evaporating pressure (the refrigerant evaporating temperature) of the first evaporator 15 by the amount, which corresponds to the pressure increasing effect of the diffuser portion 14d. Therefore, in the present embodiment, the first evaporator 15 of the high temperature side is arranged at the upstream side in the air flow A blown by the electric blower 20, and the second evaporator 18 of the low temperature side is arranged at the downstream side in the air flow A blown by the electric blower 20. In this way, the counter flow type heat exchange is performed between the refrigerant flow of the first and second evaporators 15, 18 and the air flow blown by the electric blower 20.

Thus, in both of the first and second evaporators 15, 18, the temperature difference between the refrigerant evaporating temperature and the air temperature can be implemented. Therefore, the blown air can be effectively cooled by the combination of the first and second evaporators 15, 18.

Furthermore, since the intake pressure of the compressor 1 can be increased by the pressure increasing effect of the diffuser portion 14d, the drive force of the compressor 1 can be reduced.

There is provided the branch passage 16, which is branched on the upstream side of the ejector 14 and is connected to the refrigerant suction inlet 14b of the ejector 14, and the capillary tube 17 and the second evaporator 18 are provided in the branch passage 16. Thus, the second evaporator 18 is arranged in parallel with the ejector 14. Therefore, the refrigerant is circulated into the second evaporator 18 through use of not only the refrigerant suction capacity (suction force) of the ejector 14 but also the refrigerant suction capacity (suction force) of the compressor 11.

Because of this, even in the low input operational condition (time of the low thermal load) of the ejector 14, it is relatively easy to implement the required refrigerant flow quantity of the second evaporator 18 and the required cooling performance of the second evaporator 18. At the same time, the flow quantity of the second evaporator 18 can be easily adjusted by the dedicated capillary tube 17.

In the present embodiment, the capillary tube 17 is used as the throttle mechanism arranged on the upstream side of the second evaporator 18. Thus, in comparison to the case where the expansion valve is used as the throttle mechanism arranged on the upstream side of the second evaporator, the present embodiment provides the following advantages.

Figure 4:
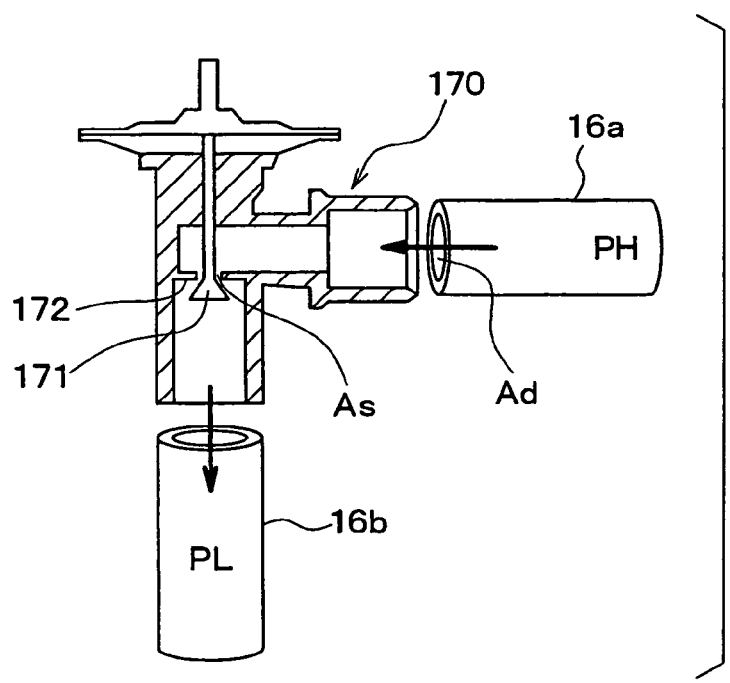
FIG. 4 is an enlarged schematic view of an expansion valve, which serves as a comparative example with respective to the capillary tube of the refrigeration cycle shown in FIG. 1.

FIG. 4 is a partial cross sectional view indicating a previously proposed expansion valve 170. A valve body 171 is moved in an up-down direction in FIG. 4 according to the superheat of the refrigerant at the outlet of the second evaporator 18 to adjust the minimum refrigerant passage cross sectional area As, which is defined by the valve body 171 and a valve seat 172.

In the expansion valve 170 of this kind, the passage cross sectional area Ad of the high pressure pipe 16a is rapidly reduced to the minimum refrigerant passage cross sectional area As, which is defined between the valve body 171 and the valve seat 172, so that the predetermined amount of pressure reduction (=PH−PL) is achieved. That is, in the expansion valve 170, the required amount of pressure reduction is achieved only by the minimum refrigerant passage cross sectional area As between the valve body 171 and the valve seat 172.

In contrast, in the capillary tube 17 used in the present embodiment, as described above, the predetermined amount of pressure reduction (=PH−PL) is achieved by the effect of reducing the refrigerant passage cross sectional area to the minimum refrigerant passage cross sectional area As by the use of the capillary tube inner diameter and the pipe internal frictional force (the pipe pressure loss), which is generated in the direction of the pipe length L of the capillary tube 17.

As clearly understood from the depressurization characteristics of FIG. 3, by increasing the length L of the capillary tube 17 relative to the predetermined amount of pressure reduction P1 (=PH−PL), the inner diameter of the capillary tube 17 can be increased. Therefore, through the selection of the pile length L, the capillary tube 17 allows an increase in the minimum refrigerant cross sectional area As relative to the predetermined amount of pressure reduction in comparison to the expansion valve 170.

Therefore, the use of the capillary tube 17 allows an increase in the flow of the refrigerant, which is branched on the upstream side of the ejector 14 and is supplied to the second evaporator 18 of the low temperature side.

In other words, in the throttle mechanism, such as the expansion valve 170, which rapidly reduces the cross sectional area of the refrigerant passage, the refrigerant flow loss is relatively large. In contrast, in the throttle mechanism, such as the capillary tube 17, which gradually reduces the pressure through use of the pipe internal frictional force (the pipe pressure loss) generated in the direction of the pipe length L of the capillary tube 17, the refrigerant flow loss is relatively small. Thus, a flow coefficient of the capillary tube 17 can be made larger than that of the expansion valve 170. Therefore, at the same amount of pressure reduction, the capillary tube 17 can supply the greater amount of refrigerant to the second evaporator 18 of the low temperature side in comparison to the expansion valve 170.

Thus, it is possible to increase the cooling performance (the refrigerating performance) of the second evaporator 18 of the low temperature side, which has the lower refrigerant evaporating temperature in comparison to the first evaporator 15. In this way, the entire cooling performance of the cooling unit 19 can be effectively increased.

Furthermore, in the capillary tube 17, the minimum refrigerant passage cross sectional area As can be made sufficiently large, which is much larger than that of the expansion valve 170, so that it is possible to limit clogging of the refrigerant passage by debris or the like. Therefore, it is possible to limit the substantial deterioration of the performance caused by the clogging of the refrigerant passage.

Furthermore, the structure of the capillary tube 17 can be made much simpler in comparison to the expansion valve 170. Thus, it is possible to simplify the throttle mechanism and to reduce the costs.

Second Embodiment

Figure 5:
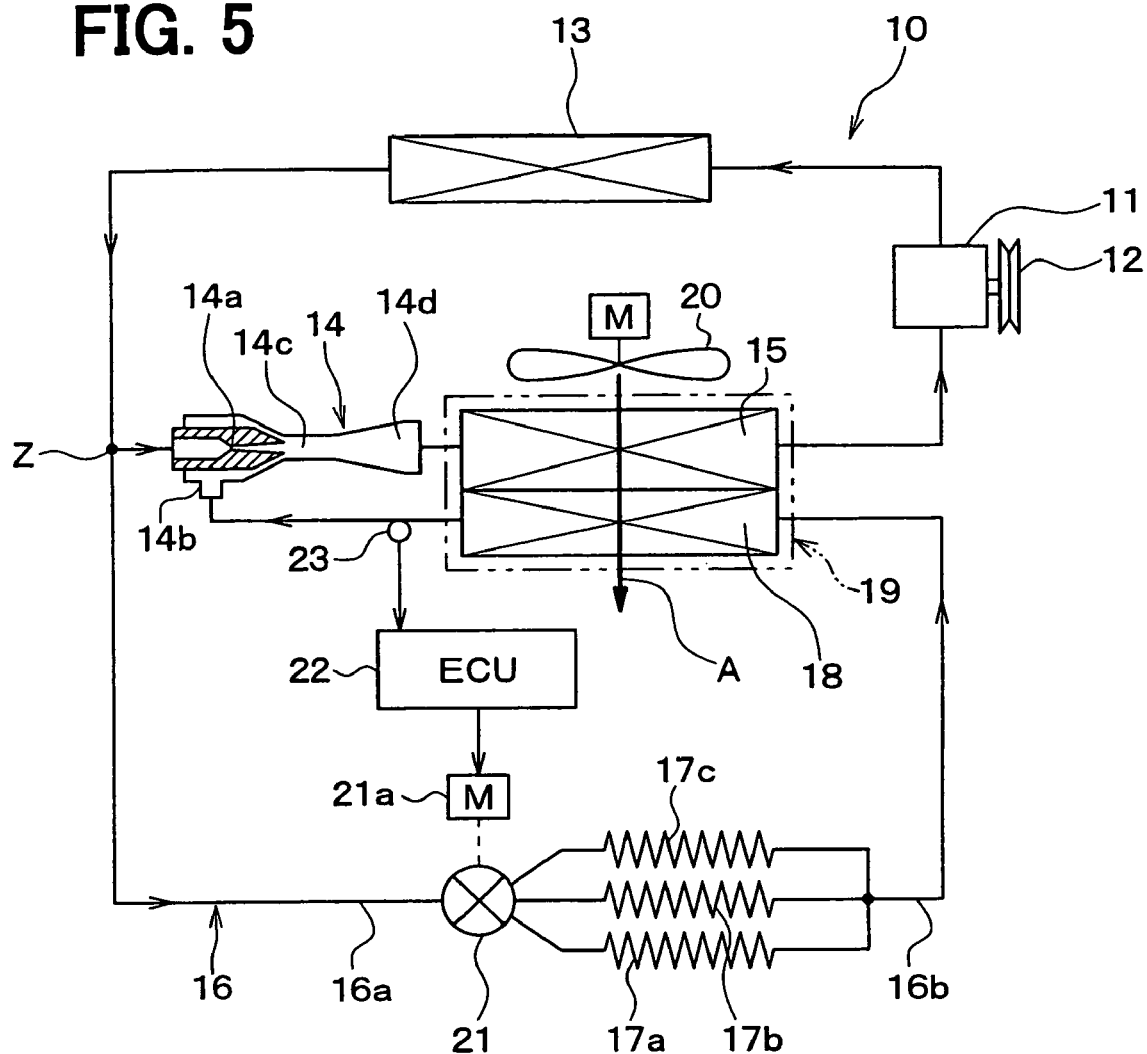
FIG. 5 is a refrigerant circuit diagram indicating an ejector refrigeration cycle according to a second embodiment of the present invention.

FIG. 5 shows a second embodiment, in which a plurality of capillary tubes 17a, 17b, 17c, which have different degrees of throttling, respectively, are used as the throttle mechanism arranged on the upstream side of the second evaporator 18 of the low temperature side. Effective one of the capillary tubes 17a, 17b, 17c is selected and is used through operation of a single flow passage change valve (a flow passage changing means) 21 to conduct the refrigerant.

The degrees of throttling of the capillary tubes 17a, 17b, 17c are increased in the order of 17a<17b<17c. Specifically, in the present embodiment, the pipe lengths L of the capillary tubes 17a, 17b, 17c are increased in the order of 17a<17b<17c, so that the degrees of throttling of the capillary tubes 17a<17b<17c are increased in the order of 17a<17b<17c.

Alternatively, the minimum refrigerant passage cross sectional areas As of the capillary tubes 17a, 17b, 17c may be reduced in the order of 17a>17b>17c, so that the degrees of throttling of the capillary tubes may be increased in the order of 17a<17b<17c. Furthermore, the degrees of throttling of the capillary tubes 17a, 17b, 17c may be changed by appropriately selecting a combination of the pipe length L and the minimum refrigerant passage cross sectional area As of each of the capillary tubes 17a, 17b, 17c.

The flow passage change valve 21 may be, for example, a rotary valve mechanism, which includes a cylindrical rotatable valve body (not shown) that is rotated by an actuator 21a, such as a servo motor. In the rotary valve mechanism, by selecting a rotational position of the valve body, the high pressure pipe 16a of the branch passage 16 is connected to one of the capillary tubes 17a, 17b, 17c.

The actuator 21a is controlled by a control unit 22, which includes a microcomputer. The control unit 22 receives signals from sensors, which sense a cycle operational state, i.e., a state of the ejector refrigeration cycle 10. Theses sensors may include, for example, a sensor 23, which senses a state (e.g., a temperature or a pressure) of refrigerant at the outlet of the second evaporator 18.

According to the second embodiment, the capillary tubes 17a, 17b, 17c, which have different degrees of throttling, respectively, are changed from one to another by the flow passage change valve 21 based on the cycle operational state. One exemplary case for this operation will be described. First, the control unit 22 computes the degree of superheat of the refrigerant at the outlet of the second evaporator 18 based on the measurement signal of the sensor 23, which senses the state of the refrigerant at the outlet of the second evaporator 18. When the computed degree of superheat is smaller than a first determination value, the control unit 22 operates the flow passage change valve 21 to use the capillary tube 17c, which has the largest degree of throttling. In this way, the refrigerant flow quantity supplied to the second evaporator 18 can be reduced.

When the computed degree of superheat is between the first determination value and a second determination value, which is larger than the first determination value, the control unit 22 operates the flow passage change value 21 to select the capillary tube 17b. In this way, the refrigerant flow quantity supplied to the second evaporator 18 can be increased in comparison to the above-described case.

When the computed degree of superheat is larger than the second determination value, the control unit 22 operates the flow passage change valve 21 to use the capillary tube 17a, which has the smallest degree of throttling. In this way, the refrigerant flow quantity supplied to the second evaporator 18 can be increased in comparison to the above-described case.

As described above, one of the capillary tubes 17a, 17b, 17c is selected based on the degree of superheat of the refrigerant at the outlet of the second evaporator 18. Thus, the refrigerant flow quantity is adjusted based on the degree of superheat of the refrigerant at the outlet of the second evaporator 18, and thereby the degree of superheat of the refrigerant at the outlet of the second evaporator 18 is kept within a predetermined range.

The capillary tubes 17a, 17b, 17c, which have the different degrees of throttling, respectively, are changed from one to the other, and thereby the refrigerant evaporating pressure of the second evaporator 18 is changed. Thus, the refrigerant evaporating temperature of the second evaporator 18 is also controlled.

Third Embodiment

Figure 6:
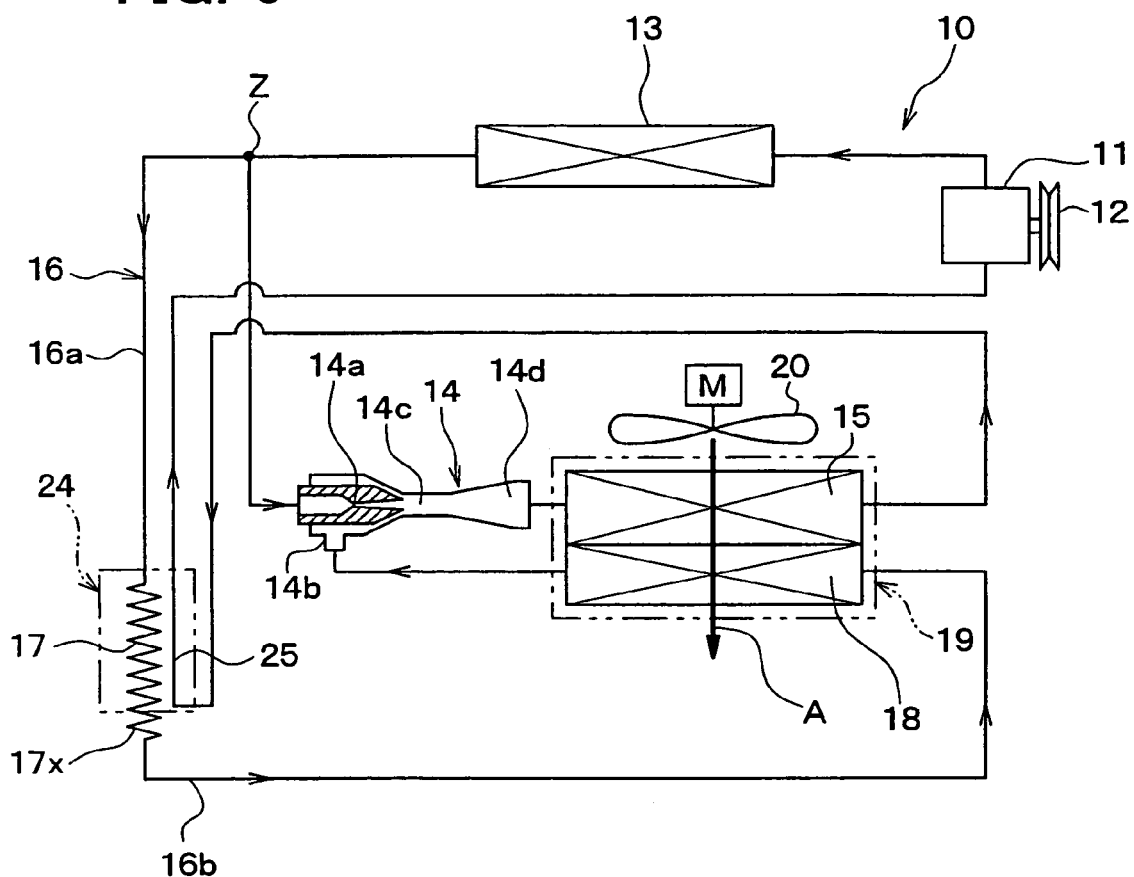
FIG. 6 is a refrigerant circuit diagram indicating an ejector refrigeration cycle according to a third embodiment of the present invention.
Figure 7A:
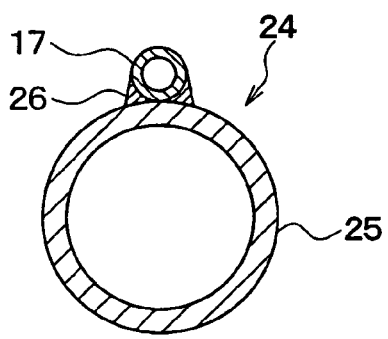
FIGS. 7A and 7B are cross sectional views indicating exemplary installation structures, respectively, of an internal heat exchanger, which includes a capillary tube according to a third embodiment of the present invention.
Figure 7B:
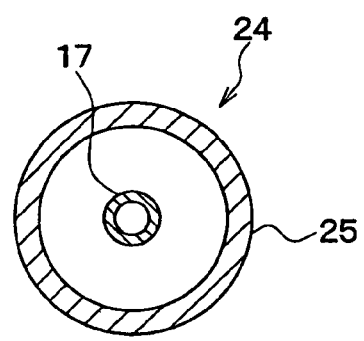

FIGS. 6 to 7B show a third embodiment, in which the capillary tube 17 forms a part of an internal heat exchanger (a heat exchanging structure) 24.

Specifically, the capillary tube 17 and an intake pipe 25 of the compressor 11 are arranged in such a manner that heat is exchangeable between the capillary tube 17 and the intake pipe 25. Here, the heat is exchanged between the refrigerant in a depressurizing process in the capillary tube 17 and the intake refrigerant to be supplied to the compressor 11.

The intake pipe 25 of the compressor 11 is a refrigerant pipe that connects between the outlet of the first evaporator 15 and the intake side of the compressor 11. The internal heat exchanger 24 has the counter flow type heat exchange structure, in which the refrigerant flow direction in the capillary tube 17 and the refrigerant flow direction in the intake pipe 25 are opposite to each other.

Specifically, FIG. 7A shows a first exemplary case of the internal heat exchanger 24, in which the capillary tube 17 is placed on the outer peripheral surface of the intake pipe 25 of the compressor 11 in such a manner that the capillary tube 17 and the intake pipe 25 are joined together by a joining metal material, which shows a relatively high heat conductivity.

In this instance, the joining metal material 26 may be, for example, solder or brazing metal. In a case where the capillary tune 17 and the intake pipe 25 are respectively made of a corresponding copper tube, the joining metal material 26 may be the solder, and the capillary tube 17 and the intake pipe 25 may be soldered together by the solder. Furthermore, in another case where the capillary tube 17 and the intake pipe 25 are respectively made of a corresponding aluminum pipe, the joining metal material 26 may be the brazing metal, and the capillary tube 17 and the intake pipe 25 may be brazed together by the brazing metal.

The capillary tube 17 may extend linearly in an axial direction of the intake pipe 25 of the compressor 11 along the outer peripheral surface of the intake pipe 25 or may extend spirally along the outer peripheral surface of the intake pipe 25.

FIG. 7B shows a second exemplary case of the internal heat exchanger 24, in which the capillary tube 17 is coaxially arranged in the center of the interior of the intake pipe 25. With this configuration, the internal heat exchanger 24 serves as a double-pipe heat exchanging structure. The specific structure of the internal heat exchanger 24 is not limited to those shown in FIGS. 7A and 7B. Specifically, as long as the heat is exchangeable between the capillary tube 17 and the intake pipe 25, any other suitable structure can be implemented in the internal heat exchanger 24.

As shown in FIG. 6, a predetermined downstream end region 17x of the capillary tube 17 is spaced away from the intake pipe 25 to limit, i.e., disable the direct heat exchange between the predetermined downstream end region 17x and the intake pipe 25. In this embodiment, the refrigerant temperature inside the capillary tube 17 decreases from the upstream side of the capillarity tube 17 to the downstream side of the capillary tube 17. Thus, in the predetermined downstream end region 17x, the refrigerant temperature inside the capillary tube 17 is lower than the refrigerant temperature inside the intake pipe 25, so that the predetermined downstream end region 17x does not exchange the heat with the intake pipe 25.

Next, the operation of the ejector refrigeration cycle 10 according to the third embodiment will be described. In the third embodiment, similar to the first embodiment, the high pressure refrigerant located on the downstream side of the radiator 13 is divided into two refrigerant flows on the upstream side of the ejector 14, and one of the two refrigerant flows passes the ejector 14 and is supplied to the first evaporator 15. The other one of the refrigerant flows is supplied to the branch passage 16, in which the other one of the refrigerant flows is depressurized by the capillary tube 17 and is evaporated in the second evaporator 18, and this evaporated refrigerant is thereafter drawn into the ejector 14.

The basic cycle behavior, i.e., the basic behavior of the ejector refrigeration cycle 10 of the third embodiment is the same as that of the first embodiment. Specifically, similar to the first embodiment, the refrigerant, which is to be drawn into the ejector 14 and flows in the second evaporator 18, has the refrigerant evaporating temperature that is lower than that of the first evaporator 15 by the amount that is equal to the increase in the pressure at the ejector 14.

In the third embodiment, the internal heat exchanger 24 has the unique structure, in which the capillary tube 17 forms the part of the internal heat exchanger 24. The cycle behavior of the third embodiment, which uses the unique internal heat exchanger 24, will be described with reference to a Mollier diagram shown in FIG. 8.

Figure 8:
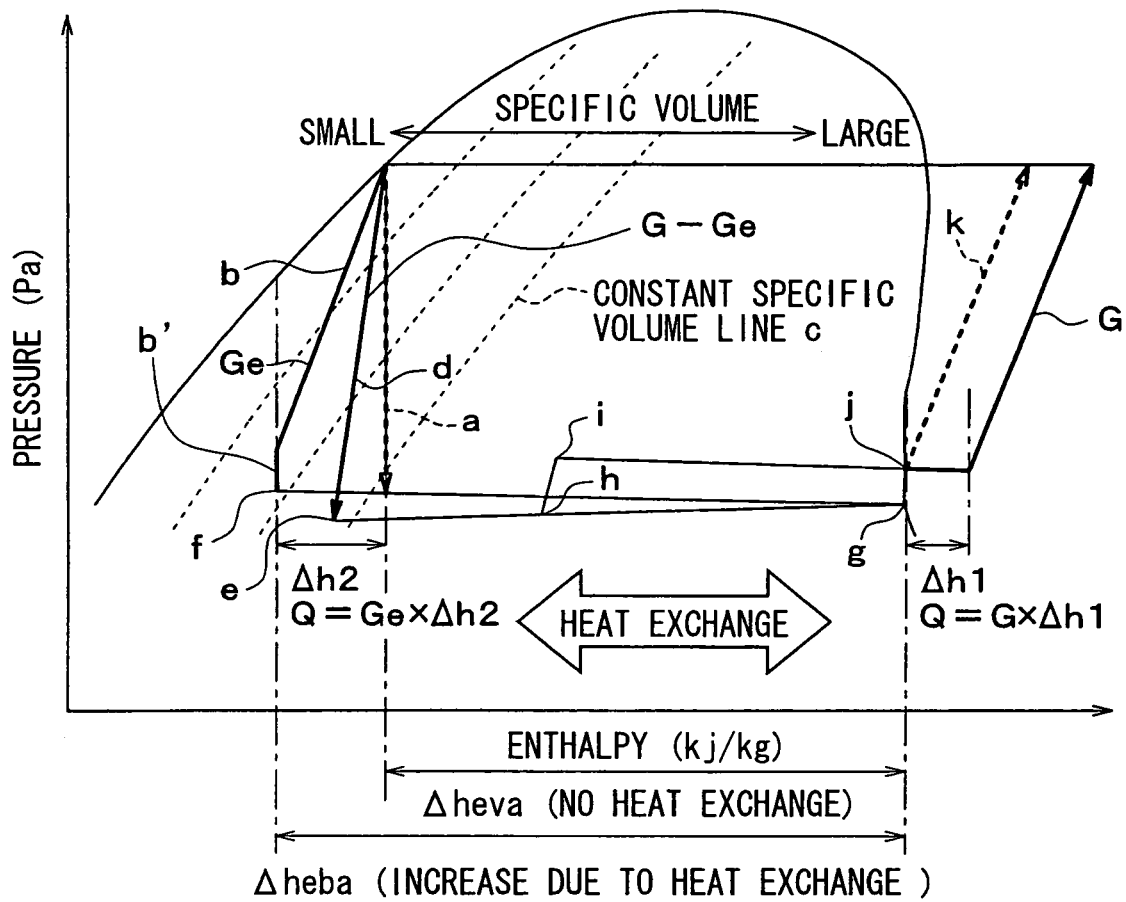
FIG. 8 is a Mollier diagram indicating an operation of the ejector refrigeration cycle according to the third embodiment.

A dotted line a in FIG. 8 shows the behavior of the refrigerant in a case (a comparative example) where the high pressure refrigerant located on the downstream side of the radiator 13 is depressurized by the capillary tube 17 without the internal heat exchange. In this case, a degree of dryness and a specific volume of the refrigerant in the depressurizing process are increased, so that a rapid phase change (rapid expansion) of the refrigerant occurs, and thereby the refrigerant does not flow smoothly in the capillary tube 17.

In contrast, according to the third embodiment, there is provided the internal heat exchanger 24, in which the heat is exchanged between the capillary tube 17 and the compressor intake pipe 25, so that the refrigerant, which flows in the capillary tube during the depressurizing process, is cooled by the compressor intake pipe 25. Thus, as indicated by a solid line b in FIG. 8, in the depressurizing process of the capillary tube 17, the behavior of the refrigerant changes in such a manner that the degree of dryness of the refrigerant in the capillary tube 17 is reduced, and a ratio of the liquid phase refrigerant is increased.

As a result, in the depressurizing process, the refrigerant, which flows in the capillary tube 17, changes along a constant specific volume line c, so that the rapid expansion of the refrigerant in the capillary tube 17 is limited. Therefore, the refrigerant flow in the capillary tube 17 is promoted, and thereby the refrigerant flow quantity Ge in the second evaporator 18 of the low temperature side at the predetermined amount of pressure reduction can be increased.

Therefore, according to the third embodiment, in addition to the flow quantity increasing effect caused by the moderate depressurizing action of the capillary tube 17, the depressurizing action along the constant specific volume line c through the internal heat exchange can be achieved. In this way, the refrigerant flow quantity Ge in the second evaporator 18 of the low temperature side can be further effectively increased.

Furthermore, the refrigerant in the capillary tube 17 is cooled through the heat exchange between the capillary tube 17 and the compressor intake pipe 25, so that the degree of dryness of the refrigerant is reduced, and thereby the ratio of the liquid phase refrigerant is increased. As a result, the refrigerating effect of the second evaporator 18 of the low temperature side is increased by the amount that is equal to the enthalpy $\Delta h2$ of FIG. 8, so that the evaporator cooling performance can be improved.

In FIG. 8, the total refrigerant flow quantity driven by the compressor 11 in the refrigeration cycle is indicated by G, and the refrigerant flow quantity (the flow quantity of the ejector drive flow) supplied from the branch point Z to the ejector 14 side is indicated by G-Ge. Here, the refrigerant flow quantity Ge is the refrigerant flow quantity of the second evaporator 18, which flows from the branch point Z to the branch passage 16.

In the internal heat exchanger 24, the amount of refrigerant heat release Q in the capillary tube 17 is defined by $Ge \times \Delta h2$, and the amount of refrigerant heat absorption Q at the compressor intake pipe 25 side is defined by $G \times \Delta h1$. Here, $\Delta h1$ is the enthalpy difference between the inlet and outlet of the compressor intake pipe 25 in the internal heat exchanger 24.

The solid line d of FIG. 8 indicates the depressurizing process by the nozzle portion 14a of the ejector 14, in which the refrigerant changes along a constant entropy line. Furthermore, a point e of FIG. 8 indicates the refrigerant state at the outlet of the nozzle portion 14a.

Furthermore, as described above, the predetermined downstream end region 17x of the capillary tube 17 is spaced away from the intake pipe 25 to limit the heat exchange between the predetermined downstream end region 17x and the intake pipe 25. Thus, due to the fact that the heat is not exchanged between the predetermined downstream end region 17x of the capillary tube 17 and the intake pipe 25, when the refrigerant in the capillary tube 17 reaches the predetermined downstream end region 17x, the refrigerant shows the isenthalpic change, as indicated by a solid line b' in FIG. 8.

Apart from the third embodiment, if it is assumed that the internal heat exchange is performed in the predetermined downstream end region 17x of the capillary tube 17, the refrigerant temperature in the predetermined downstream end region 17x of the capillary tube 17 becomes substantially lower than the refrigerant temperature in the intake pipe 25. Thus, the refrigerant in the capillary tube 17 absorbs the heat from the intake pipe 25 side. The third embodiment can limit such a disadvantage.

In FIG. 8, a point f is the outlet of the capillary tube 17, i.e., is the inlet of the second evaporator 18, and a point g is the outlet of the second evaporator 18. Furthermore, $\Delta heba$ is the enthalpy difference between the inlet and outlet of the second evaporator 18 of the low temperature side (the refrigerating effect of the second evaporator 18), and $\Delta heva$ is the enthalpy difference between the inlet and outlet of the second evaporator 18 of the low temperature side in the case (the comparative example) where the depressurization is carried out by the capillary tube 17 without the internal heat exchange.

Also, in FIG. 8, a point h is the refrigerant state in the mixing portion 14c of the ejector 14, i.e., the state of the mixed refrigerant that is formed by mixing the suctioned refrigerant, which is drawn from the outlet of the second evaporator 18, and the refrigerant, which is discharged from the nozzle portion 14a. A point i is the refrigerant state after the pressurization in the diffuser portion 14d of the ejector 14, i.e., the state of the refrigerant at the inlet of the first evaporator 15. Furthermore, a point i is the refrigerant state at the outlet of the first evaporator 15. Furthermore, a dotted line k indicates the compressing process in the case where the depressurization is carried out by the capillary tube 17 without the internal heat exchange.

Fourth Embodiment

Figure 9:
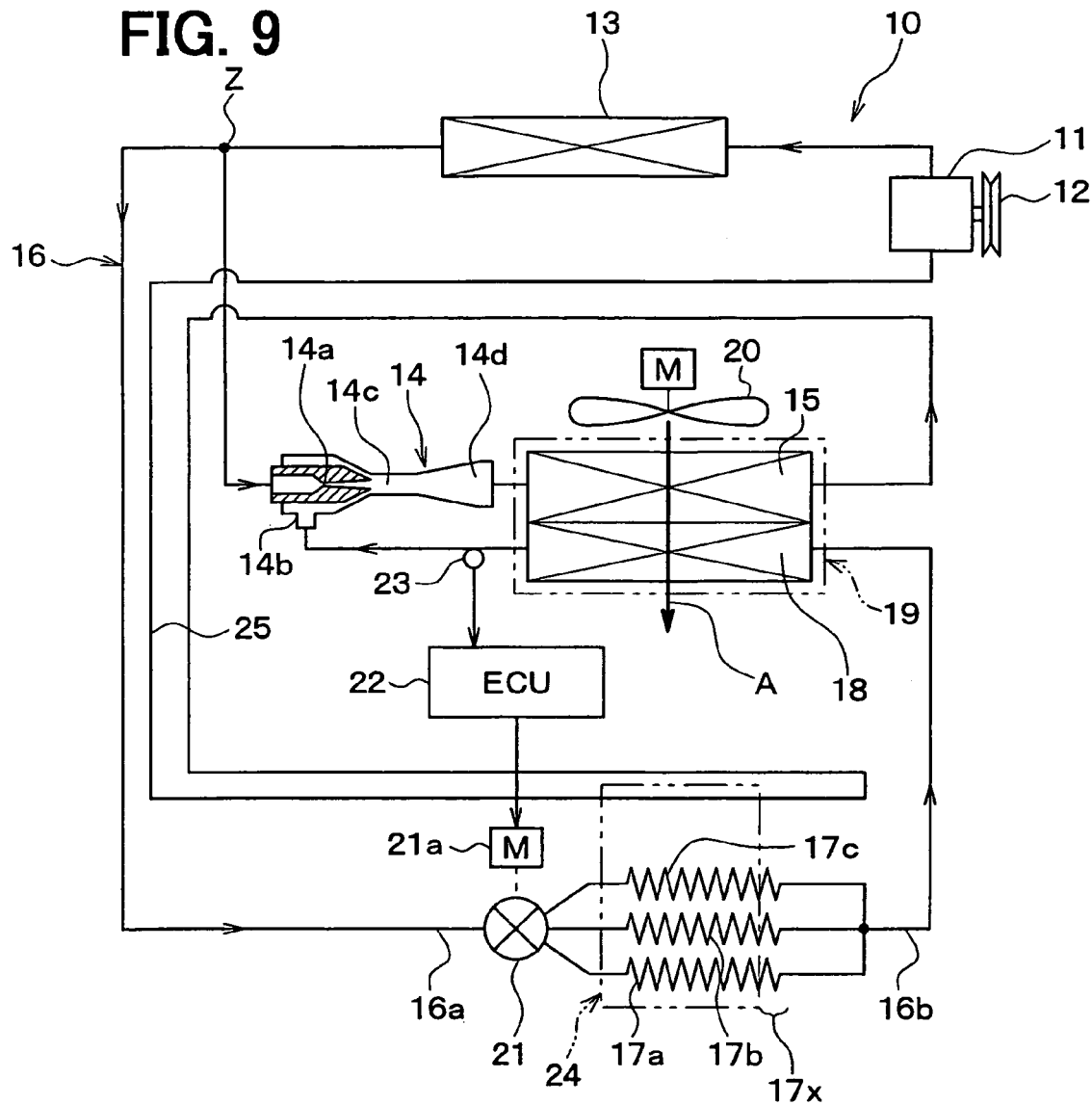
FIG. 9 is a refrigerant circuit diagram indicating an ejector refrigeration cycle according to a fourth embodiment of the present invention.

FIG. 9 shows a fourth embodiment of the present invention, which is a modification of the third embodiment where the capillary tubes 17a, 17b, 17c of the second embodiment, which have the different degrees of throttling, respectively, are changed from one to another by the flow passage change valve 21. The capillary tubes 17a, 17b, 17c and the flow passage change valve 21 may be the same as those of the second embodiment.

According to the fourth embodiment, the advantages of the third embodiment and the advantages of the second embodiment can be achieved.

Figure 10A:
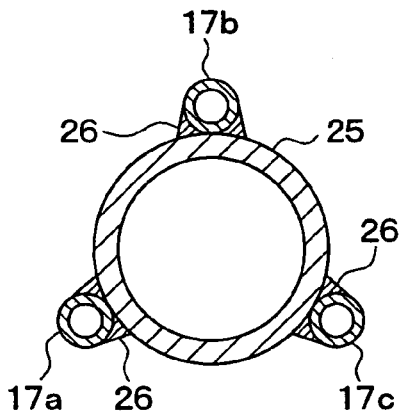
FIGS. 10A and 10B are cross sectional views indicating exemplary installation structures, respectively, of an internal heat exchanger, which includes a capillary tube according to a fourth embodiment of the present invention.
Figure 10B:
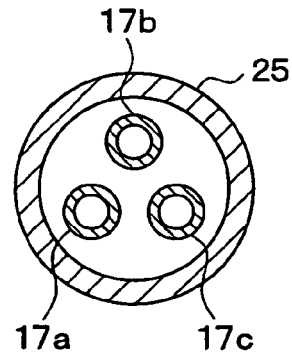

FIGS. 10A and 10B show the specific structural example of the internal heat exchanger 24 of the fourth embodiment. FIG. 10A corresponds to FIG. 7A, and FIG. 10B corresponds to FIG. 7B.

Fifth Embodiment

In each of the above embodiments, only the predetermined downstream end regions of the capillary tubes 17, 17a, 17b, 17c are spaced away from the intake pipe 25 to limit the heat exchange therebetween. However, according to a fifth embodiment, as shown in FIG. 11A, the predetermined downstream end region 17x of the capillary tube 17 and a predetermined upstream end region 17y of the capillary tube 17 are both spaced away from the intake pipe 25 to limit the heat exchange therebetween.

Therefore, a heat exchanging portion 24a of the internal heat exchanger 24 is formed only in a longitudinal center part of the capillary tube 17.

Figure 11A:
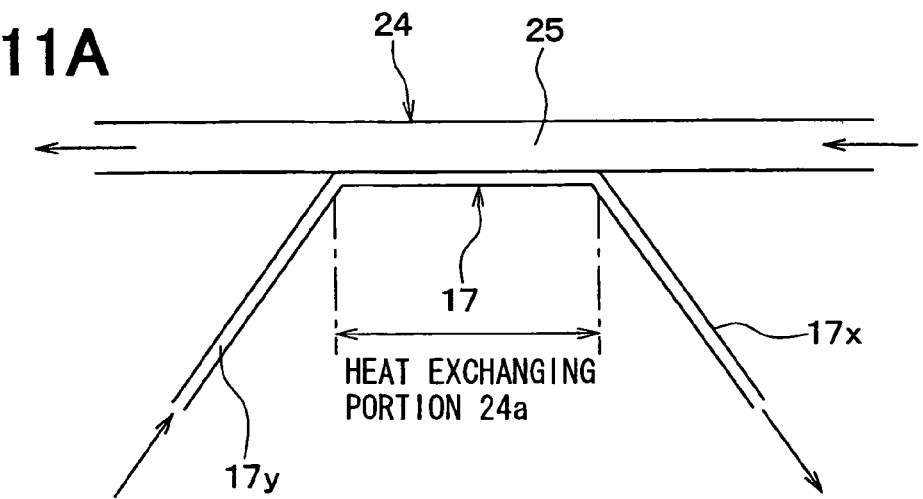
FIGS. 11A and 11B are cross sectional views indicating exemplary installation structures, respectively, of an internal heat exchanger, which includes a capillary tube according to a fifth embodiment of the present invention.
Figure 11B:
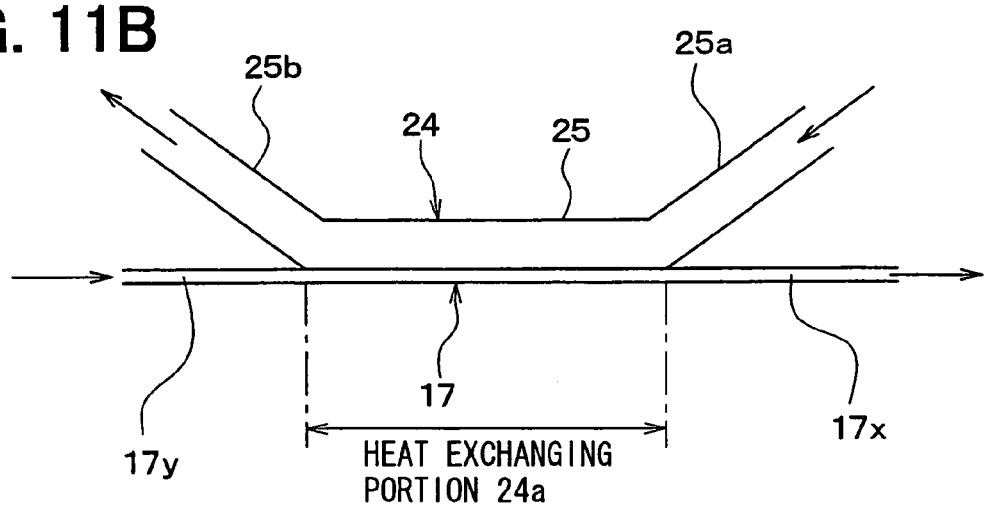

In FIG. 11A, the predetermined downstream end region 17x and the predetermined upstream end region 17y of the capillary tube 17 are bent in a direction away from the intake pipe 25. Alternatively, as shown in FIG. 11B, a predetermined upstream end region 25a and a predetermined downstream end region 25b of the intake pipe 25 may be bent in a direction way from the capillary tube 17.

At the time of installing the refrigeration cycle 10 to the vehicle, it is often difficult to place the entire length of the capillary tube 17 along the intake pipe 25 due to, for example, specific arrangement of the respective devices. Thus, in the real product, the arrangement shown in FIGS. 11A or 11B is often used.

Sixth Embodiment

Figure 12A:
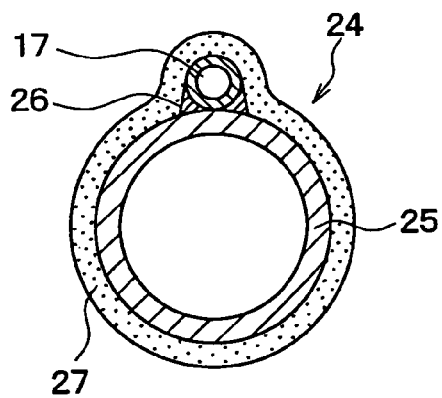
FIGS. 12A and 12B are cross sectional views indicating exemplary installation structures, respectively, of an internal heat exchanger, which includes a capillary tube according to a sixth embodiment of the present invention.
Figure 12B:
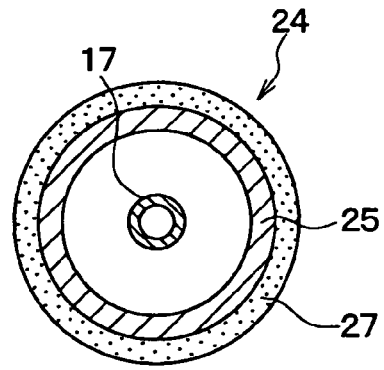

FIGS. 12A and 12B show a sixth embodiment. More specifically, FIG. 12A shows a structure of the sixth embodiment, in which an outer peripheral surface of the intake pipe 25 and an outer peripheral surface of the capillary tube 17 shown in FIG. 7A are entirely covered with a thermal insulation material (a thermal insulation means) 27. FIG. 12B shows the structure, which is similar to that of FIG. 7B but is surrounded by the thermal insulation material 27. The thermal insulation material 27 may be preferably, for example, a porous foamed resin material and is fixed to the outer peripheral surface of the intake pipe 25 and the outer peripheral surface of the capillary tube 17 by, for example, a bonding material.

According to the sixth embodiment, the temperature of the intake pipe 25 is reduced in comparison to the surrounding atmosphere, and it is possible to limit absorption of the heat by the intake pipe 25 from the surrounding atmosphere. That is, the heat loss to the surrounding atmosphere is limited by the thermal insulation material 27 to increase the heat exchange efficiency of the internal heat exchanger 24.

Seventh Embodiment

Figure 13:
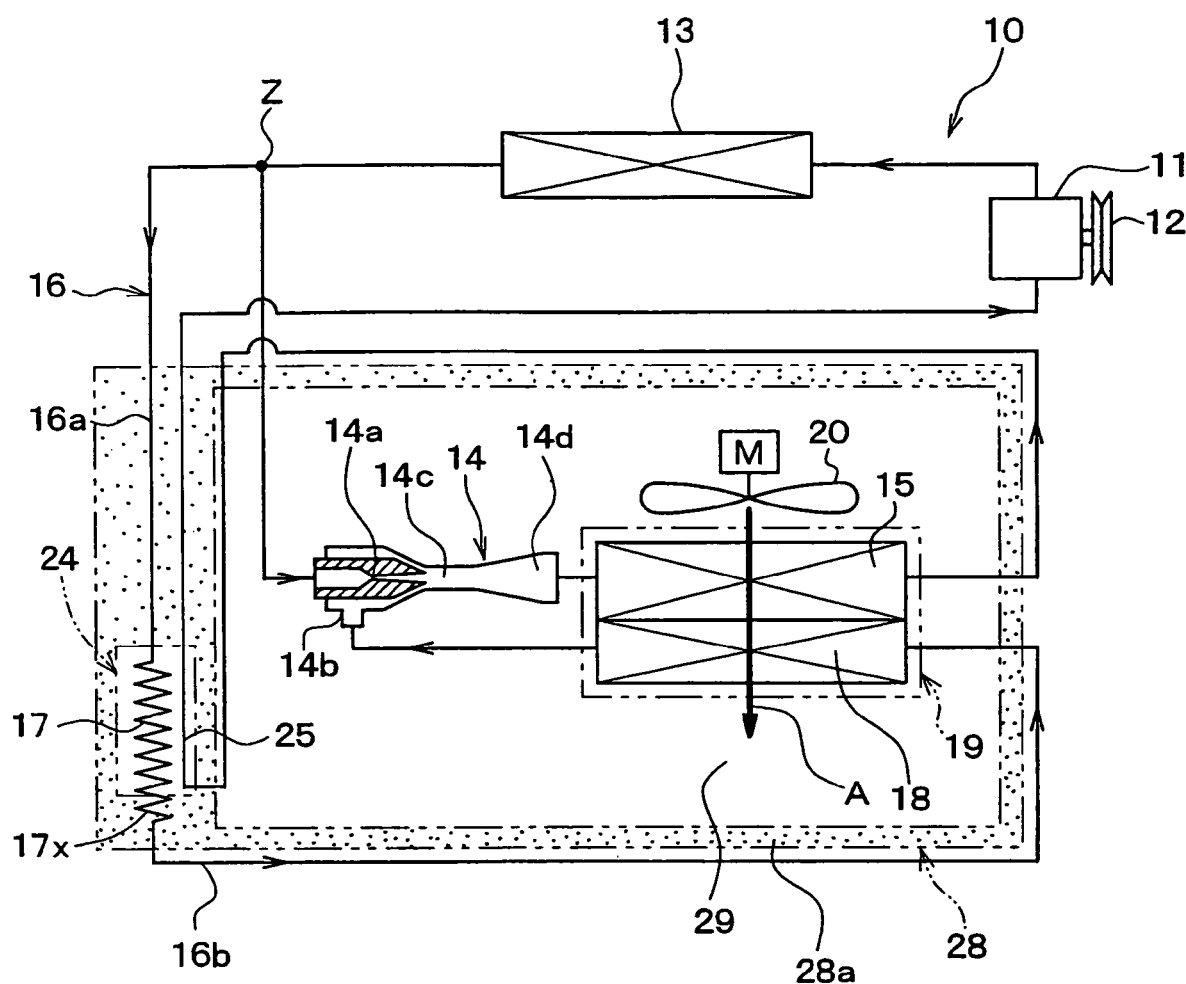
FIG. 13 is a refrigerant circuit diagram indicating a thermal insulator installation structure of an internal heat exchanger including a capillary tube according to a seventh embodiment of the present invention.

FIG. 13 shows a seventh embodiment of the present invention. Here, a thermal insulation material (a thermal insulation means) 28a, which is provided to a thermal insulation box 28 of the refrigerator, is used to achieve the advantages similar to those of the sixth embodiment.

The thermal insulation box 28 forms a cooling space 29, which is cooled by the cooling unit 19, and the thermal insulation box 28 forms a thermal insulation structure that has the thermal insulation material 28a. In the seventh embodiment, the internal heat exchanger 24 is embedded in the thermal insulation material 28a. In this way, the thermal insulation material 28a of the thermal insulation box 28 can be used to limit the heat loss to the surrounding atmosphere and thereby to improve the heat exchange efficiency of the internal heat exchanger 24.

Eighth Embodiment

Figure 14:
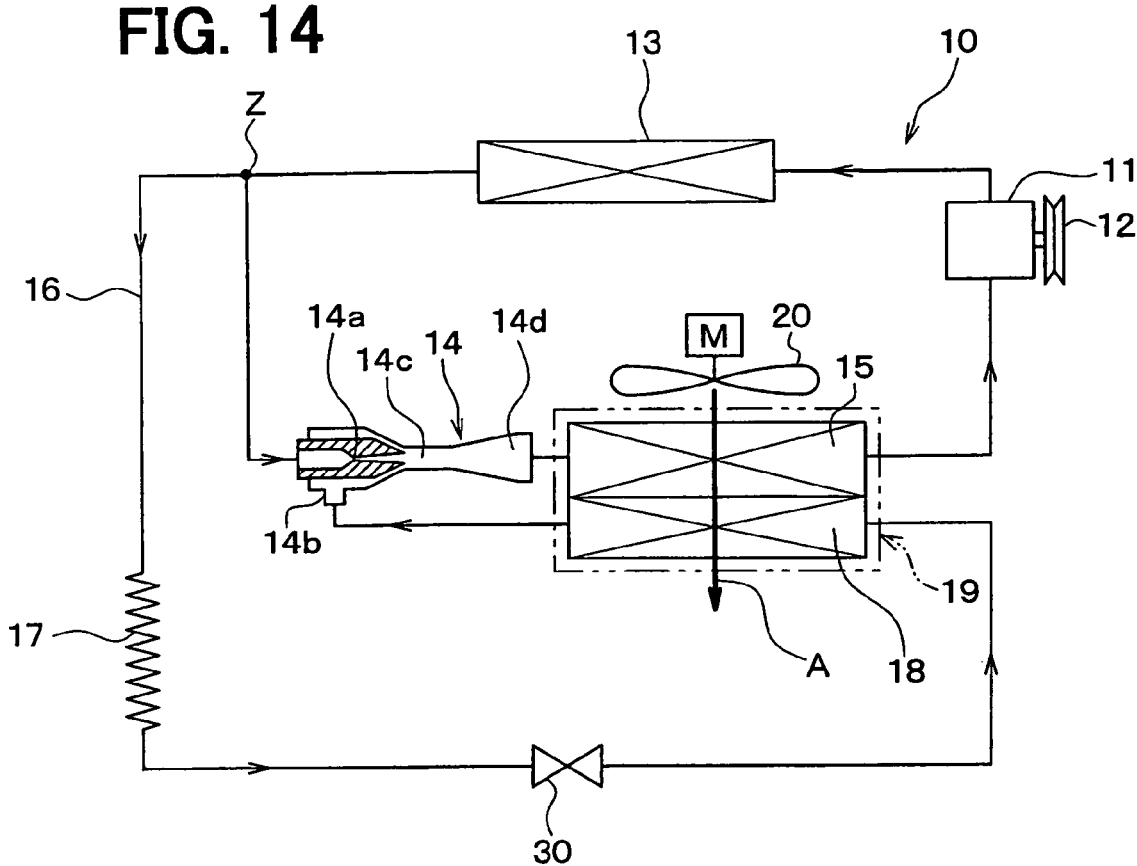
FIG. 14 is a refrigerant circuit diagram indicating an ejector refrigeration cycle according to an eighth embodiment of the present invention.
Figure 15:
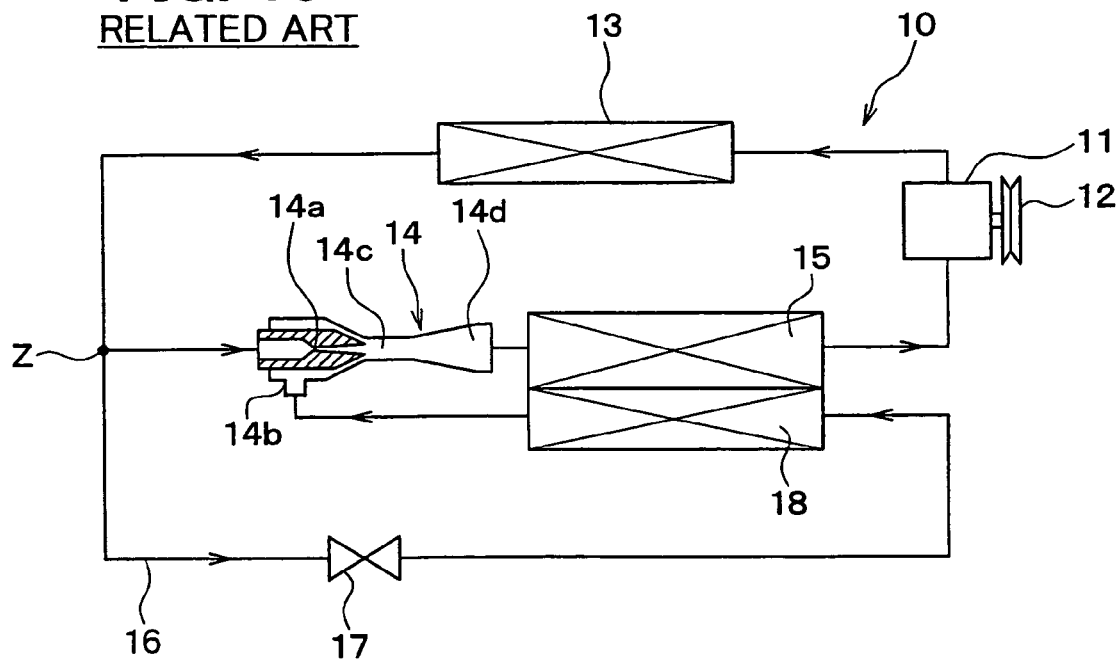
FIG. 15 is a refrigerant circuit diagram showing a previously proposed ejector refrigeration cycle.

In each of the above embodiments, the throttle mechanism of the second evaporator 18 only includes the capillary tube 17. Alternatively, in the eighth embodiment, as shown in FIG. 14, the throttle mechanism of the second evaporator 18 of the eighth embodiment includes a combination of the capillary tube 17 and another throttle mechanism 30. Even when the other throttle mechanism 30 is combined with the capillary tube 17, the advantages similar to the above-described ones can be achieved in the depressurizing process of the capillary tube 17.

The other throttle mechanism 30 may be a fixed throttle (e.g., an orifice) or a variable throttle. The variable throttle may change a passage cross sectional area based on the temperature of the refrigerant, the pressure of the refrigerant and/or the like. Furthermore, the other throttle mechanism 30 may be provided on a downstream side of the capillary tube 17, as shown in FIG. 14, and/or may be provided on an upstream side of the capillary tube 17.

The other throttle mechanism 30 may be equally used in the case of the second embodiment (FIG. 5) that utilizes the multiple capillary tubes 17a, 17b, 17c, which have the different degrees of throttling, respectively. Also, the other throttle mechanism 30 may be equally used in the case of the third embodiment (FIG. 6) that forms the internal heat exchanger 24.

Other Embodiment

The present invention is not limited to the above embodiments, and therefore the above embodiments can be varied as follows.

(1) In the above embodiments, the refrigeration cycle does not include a gas/liquid separator, which separates the supplied refrigerant into the liquid phase refrigerant and the gas phase refrigerant and accumulates the excessive liquid phase refrigerant. Alternatively, the refrigeration cycle may include such a gas/liquid separator.

Specifically, the gas/liquid separator (an accumulator) may be provided to the outlet side of the first evaporator 15, and the gas phase refrigerant, which is separated by the gas/liquid separator, may be supplied to the intake side of the compressor 11 through the intake pipe 25.

Further alternatively, the gas/liquid separator (the receiver) may be provided to the outlet side of the radiator 13, and the liquid phase refrigerant, which is separated by the gas/liquid separator, may be supplied to the branch point Z side. In this case, a refrigerant flow quantity adjust mechanism may be provided to control the degree of superheat of the refrigerant at the outlet of the first evaporator 15 and thereby to limit the recirculation of the liquid phase refrigerant to the compressor 11. The refrigerant flow quantity adjust mechanism may be a thermal expansion valve, which is positioned on an upstream side of the ejector 14, and the degree of superheat of the refrigerant at the outlet of the first evaporator 15 may be controlled by the thermal expansion valve.

(2) In the above embodiments, the first evaporator 15 of the high temperature side and the second evaporator 18 of the low temperature side are both provided in the refrigeration cycle. Alternatively, it is possible to provide only the second evaporator 18 of the low temperature side in the refrigeration cycle.

(3) In the above embodiments, the first evaporator 15 of the high temperature side and the second evaporator 18 of the low temperature side are provided in the refrigeration cycle. In addition to the first and second evaporators 15, 18, a third evaporator, in which the refrigerant evaporates at the evaporating temperature that is generally equal to that of the first evaporator 15 of the high temperature side, may be provided in the cycle.

(4) In the above respective embodiments, an electric control valve, such as a solenoid valve, for flow passage opening and closing purpose may be provided in each of the first evaporator 15 side refrigerant passage and the branch passage 16. In this way, one of the refrigerant flow to the first evaporator 15 and the refrigerant flow to the second evaporator 18 can be freely selected.

(5) In the above respective embodiments, the first evaporator 15 and the second evaporator 18 form the single cooling unit 19 that cools the cooling space in the refrigerator. Alternatively, the first evaporator 15 and the second evaporator 18 may be provided in separate cooling spaces, respectively, to cool it. In this case, the cooling temperature of the cooling space of the first evaporator 15 may be set to be relatively high, and the cooling temperature of the cooling space of the second evaporator may be set to be relatively low. In this way, it is possible to achieve the cooling operation at the two different cooling temperatures.

Furthermore, the first evaporator 15 of the high temperature side may be provided to cool the interior of the passenger compartment of the vehicle, and the second evaporator 18 of the low temperature side may be provided to cool the interior of the refrigerator. Alternatively, the first evaporator 15 of the high temperature side may be provided to cool an interior of a refrigerator room of a refrigerator-freezer, and the second evaporator 18 of the low temperature side may be provided to cool an interior of a freezer room of the refrigerator-freezer.

(6) In the above respective embodiments, the refrigerant (e.g., the fluorocarbon refrigerant or the HC refrigerant), the high pressure of which does not exceed the critical pressure, is used to form the subcritical vapor compression cycle. However, the present invention is equally applicable to a supercritical vapor compression cycle, in which the refrigerant (e.g., carbon dioxide, i.e., $CO_2$), the high pressure of which exceeds the critical pressure, is used.

However, in the supercritical vapor compression cycle, the refrigerant, which is discharged from the compressor, only releases the heat in the supercritical state in the radiator 13 and does not condense, so that the gas/liquid separator should be provided to the outlet of the first evaporator 15.

(7) In the above respective embodiments, the ejector 14 is the fixed ejector, which includes the nozzle portion 14a of the fixed constant passage cross sectional area. Alternatively, the ejector 14 may be a variable ejector, which includes a variable nozzle portion that has an adjustable passage cross sectional area.

An specific example of the variable nozzle portion may be a mechanism, in which a needle is movably received in a passage of the variable nozzle portion, and a position of the needle is controlled by an electric actuator to adjust the passage cross sectional area.

(8) In the above respective embodiments, the first evaporator 15 and the second evaporator 18 are provided as interior side heat exchangers (i.e., heat exchangers located in the interior of the subject space), which cool the subject cooling space, and the radiator 13 is provided as an exterior side heat exchanger (i.e., a heat exchanger located outside of the subject space), which releases the heat to the atmosphere. Alternatively, the present invention is also applicable to another exemplary case (a heat pump cycle), in which the first evaporator 15 and the second evaporator 18 are provided as exterior side heat exchangers, which absorb the heat from an external heat source, such as the atmosphere, and the radiator 13 may be provided as an interior side heat exchanger, which heats a subject heating fluid (e.g., air or water).

That is, the refrigeration cycle of the present invention includes the heat pump cycle, in which the radiator 13 is provided as the interior side heat exchanger.

Additional advantages and modifications will readily occur to those skilled in the art. The invention in its broader terms is therefore not limited to the specific details, representative apparatus, and illustrative examples shown and described.

What is claimed is:

1. An ejector refrigeration cycle comprising:
    a compressor that suctions and compresses refrigerant;
    a radiator that releases heat from high pressure refrigerant, which is discharged from the compressor;
    an ejector that includes:
        a nozzle portion that depressurizes and expands refrigerant, which is supplied from an outlet of the radiator;
        a refrigerant suction inlet, from which refrigerant is suctioned by a high velocity refrigerant flow that is discharged from the nozzle portion; and
        a pressurizing portion that decelerates and pressurizes a refrigerant flow, in which the high velocity refrigerant flow discharged from the nozzle portion and the suctioned refrigerant supplied from the refrigerant suction inlet are mixed;
    a branch passage that is branched at a point on an upstream side of the ejector and is connected to the refrigerant suction inlet;
    a throttle mechanism that is provided in the branch passage and includes a capillary tube; and
    an evaporator that is arranged on a downstream side of the throttle mechanism in the branch passage.

2. The ejector refrigeration cycle according to claim 1, further comprising a first evaporator that is connected on a downstream side of the ejector, wherein the evaporator of the branch passage is a second evaporator that has a refrigerant evaporating temperature, which is lower than that of the first evaporator.

3. The ejector refrigeration cycle according to claim 1, wherein the capillary tube is one of a plurality of capillary tubes, which have different degrees of throttling, respectively; and
    the ejector refrigeration cycle further comprises a flow passage changing means for changing and using an effective one of the plurality of capillary tubes.

4. The ejector refrigeration cycle according to claim 3, wherein the flow passage changing means changes and uses the effective one of the plurality of capillary tubes based on a degree of superheat of refrigerant at an outlet of the evaporator of the branch passage.

5. The ejector refrigeration cycle according to claim 1, further comprising a heat exchanging structure that exchanges heat between the capillary tube and an intake pipe of the compressor.

6. The ejector refrigeration cycle according to claim 5, wherein a predetermined downstream end region of the capillary tube is spaced away from the intake pipe to limit heat exchange between the predetermined downstream end region of the capillary tube and the intake pipe.

7. The ejector refrigeration cycle according to claim 5, wherein the capillary tube contacts an outer peripheral surface of the intake pipe in the heat exchanging structure.

8. The ejector refrigeration cycle according to claim 5, wherein the capillary tube is placed in an interior of the intake pipe in the heat exchanging structure.

9. The ejector refrigeration cycle according to claim 5, further comprising a thermal insulation means for thermally insulating between the heat exchanging structure and a surrounding atmosphere.

10. The ejector refrigeration cycle according to claim 9, wherein the thermal insulation means is a thermal insulation material, which covers the outer peripheral surface of the intake pipe.

11. The ejector refrigeration cycle according to claim 9, further comprising a thermal insulation box that includes a thermal insulation material, which serves as the thermal insulation means, wherein:

the thermal insulation box forms a subject cooling space, which is cooled by the evaporator of the branch passage; and the heat exchanging structure is embedded in the thermal insulation material of the thermal insulation box.

* * * * *